United States Patent [19]

Schmale et al.

[11] 4,360,834
[45] Nov. 23, 1982

[54] TELEVISION CAMERA COMPRISING A TELEVISION PICK-UP TUBE AND AN ANTI-MICROPHONICS CIRCUIT

[75] Inventors: Peter C. Schmale, Delft; Hendrik Blom, Breda, both of Netherlands

[73] Assignee: U.S. Philips Corporation, New York, N.Y.

[21] Appl. No.: 170,460

[22] Filed: Jul. 21, 1980

[30] Foreign Application Priority Data

Aug. 1, 1979 [NL] Netherlands .......................... 7905915

[51] Int. Cl.³ .............................................. H04N 5/34
[52] U.S. Cl. ..................................................... 358/217
[58] Field of Search ........................................ 358/217

[56] References Cited

U.S. PATENT DOCUMENTS

4,174,525 11/1979 Dechering et al. .................. 358/217

Primary Examiner—Robert L. Richardson
Attorney, Agent, or Firm—Thomas A. Briody; William J. Streeter; Edward W. Goodman

[57] ABSTRACT

A television camera comprising a television pick-up tube and an anti-microphonics circuit provided with a microphonics detection circuit (17) having a voltage-controlled oscillator included in a phase-locked loop circuit. The detection circuit (17) is not only used for switching on or off (15) the microphonics correction (14) but, as the circuit comprises a phase-locked loop resulting in a proper detection it is also possible to generate a test signal (24) by means of which the microphonics correction signal can be given the optimum phase via an automatic phase adjusting circuit (27). The microphonics correction circuit (14) comprises a low-pass filter (47–52) and a phase shifting network (53–60) for an independent adjustment of the amplitude and the phase.

6 Claims, 2 Drawing Figures

TELEVISION CAMERA COMPRISING A TELEVISION PICK-UP TUBE AND AN ANTI-MICROPHONICS CIRCUIT

BACKGROUND OF THE INVENTION

The invention relates to a television camera comprising a television pick-up tube and an anti-microphonics circuit, this circuit comprising a microphonics detection circuit, a microphonics correction circuit and an on-off switch for the microphonics correction depending on whether microphonics noise is detected or not detected.

Such a television camera is disclosed in the Netherlands Patent Application Ser. No. 76 13 357. Switching on the microphonics correction circuit only in the presence of a microphonics noise signal has the advantage that the increase in noise caused by this circuit in practice is not present when the camera operates with switched-off correction. When the correction circuit is actuated, the noise increase in a displayed picture is far less less annoying than the uncorrected, very annoying microphonics.

SUMMARY OF THE INVENTION

It is an object of the invention to provide a television camera comprising a microphonics detection circuit which does not only accomplish a proper detection of the presence of microphonics noise signals but which can also be used for an optimum adjustment of the antimicrophonics circuit. A camera according to the invention is therefore characterized in that the microphonics detection circuit comprises a voltage-controlled oscillator included in a phase-locked loop circuit, an input of the detection circuit being connected to a first connecting point in a camera signal channel via a signal sample-and-hold circuit for processing a video signal possibly comprising a microphonics noise signal, a first output of the detection circuit carrying a switching signal, being connected to a switching signal input of the on-off switch for the microphonics correction.

The use of the oscillator provides the possibility to generate a test signal and a camera according to the invention is therefore further characterized in that the detection circuit comprises a second output, carrying an oscillator signal coming from the oscillator and being coupled via a microphonics test signal circuit and a test signal on-off selection switch to a second connecting point, preceding the first connecting point in the camera signal channel, a third connecting point following after the first connecting point in the camera signal channel being connected via an automatic phase adjusting circuit to a phase adjusting input of the microphonics correction circuit, which has an input coupled to the first connecting point in the camera signal channel and is of such a construction that it supplies a microphonics correction signal, which is in anti-phase relative to the noise signal, and has an output coupled to a fourth connecting point in the signal channel present between the said first and third connecting point.

A camera in which an optimum setting of the oscillator in the detection circuit can be obtained when the pick-up tube is intentionally exposed to shock to generate microphonics, is characterized in that the detection circuit comprises a third output for carrying an in-phase signal, received from the phase-locked loop circuit, for a microphonics noise signal coming from the pick-up tube and the oscillator signal, this third output being connected to an input of a switchable pull-in indication circuit.

A camera in which the oscillator is set optimally and wherein a correction signal occurs automatically in the optimum phase for the microphonics correction is characterized in that the anti-microphonics circuit comprises a multiple selection switch having three positions, in a first position of the switch the signal sample-and-hold circuit, the microphonics detection circuit having the in-phase signal at the third output and the pull-in indication circuit being in operation when, in the presence of a microphonics noise signal coming from the pick-up tube, the center of the oscillator frequency of the oscillator is adjusted, in a second position of the switch the oscillator in the detection circuit oscillating freely with the adjusted, center frequency and producing the oscillator signal at the second output of the detection circuit, the microphonics test signal circuit, the signal sample-and-hold circuit, the microphonics correction circuit, the on-off switch for the microphonics correction in the on-position and the phase adjusting circuit being in operation, and in a third position of the switch, which corresponds with the anti-microphonics circuit being in the adjusted state, the signal sample-and-hold circuit, the microphonics detection circuit, the microphonics correction circuit and the on-off switch for the microphonics correction being in operation.

A camera comprising a simple embodiment of the microphonics correction circuit, which is particularly advantageous for a phase adjustment is characterized in that the microphonics correction circuit comprises a low-pass filter connected to an input, this input being coupled to the first connecting point in the camera signal channel, the low-pass filter being connected to an output of the microphonics correction circuit via an adjustable phase-shifting network.

A camera comprising a simple embodiment of a phase adjusting circuit, is characterized in that the phase adjusting circuit comprises a series arrangement provided with a signal sample-and-hold circuit, which is in operation in line blanking periods, in field scanning periods, with a field change-over switch for alternately, in each field, applying the signal samples to a signal comparison circuit, with a storage circuit for retaining a counting direction of a counter, the counting direction being reversed when an increase in the signal sample occurs, with a digital-to-analog converter following after the counter, and with an amplifier circuit, the output of which is connected to the phase adjusting input of the microphonics correction circuit.

DESCRIPTION OF THE DRAWINGS

The invention and its advantages will now be further explained by way of a non-limitative example with reference to the Figures, in which FIG. 1 show block-diagrammatically an embodiment of a camera according to the invention.

DESCRIPTION OF THE PREFERRED EMBODIMENT

Figure 1:
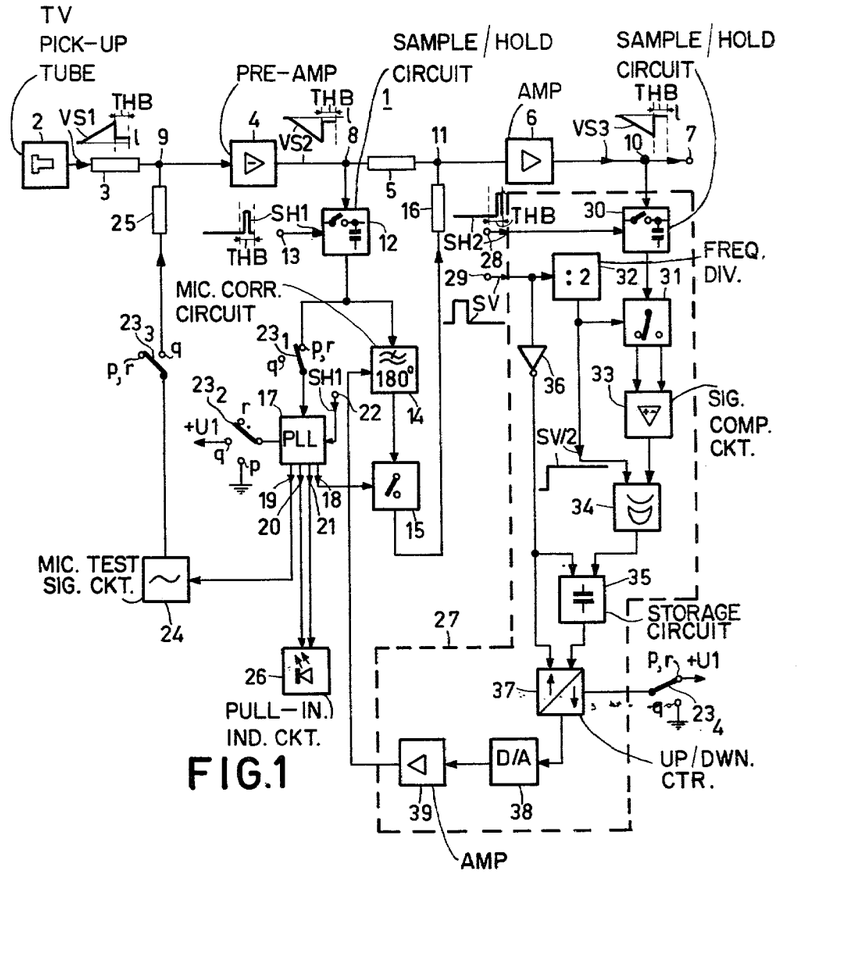

Referring to FIG. 1, there is shown a signal channel 1 of a television camera which includes the series arrangement of a television pick-up tube 2, a resistor 3, a pre-amplifier circuit 4, a resistor 5, an amplifier circuit 6 and an output terminal 7. The television pick-up tube 2 is part of a signal source, not further shown, comprising supply voltages, deflection circuits, focussing circuits etc. The only relevant fact is that the pick-up tube 2 is a picture or video signal source in which a microphonics noise signal may occur. This noise signal is produced by a mesh electrode which vibrates owing to mechanical or acoustical causes and which is arranged near a target plate in the pick-up tube 2, a potential picture, which is converted by means of an electron beam scan into the picture signal having a bandwidth of 0 to approximately 5 MHz, being formed on this target plate. The microphonics noise signals has a frequency of approximately 1 to 3 kHz.

The signal coming from pick-up tube 2 is represented by VS1 in FIG. 1. THB denotes a line blanking period, the picture or video information having been given in a portion of a preceding line scan period. The signal VS1 is shown with a signal which linearly increases from a black level 1 till the period THB, wherein the same black level 1 must occur if no microphonics noise signal is present. The drawing shows for the signal VS1 that a microphonics noise has affected the signal level 1 in the period THB.

In the signal channel 1 reference numerals 8, 9, 10 and 11 denote four connecting points, which are important for understanding the operation of the anti-microphonics circuit shown in FIG. 1. The first connecting point 8 follows after the pre-amplifier circuit 4, which carries a signal VS2 shown next to it. In the inverting pre-amplifier circuit 4 the signal level in a portion of the period THB is brought in a customary manner to a reference value, for example the ground potential, by means of a clamping circuit. When microphonics occurs the clamping circuit cannot follow the resultant signal deviation, so that the signal difference mentioned for the signal VS1 remains present in the signal VS2 in the period of time THB between the black level 1 and the instantaneous value. The third connecting point 9 is connected to the input of the pre-amplifier circuit 4. The fourth connecting point 10 follows the amplifier circuit 6 and the second connecting point 11 is connected to the input thereof. A signal VS3 is shown next to the connecting point 10 and the output terminal 7 which represents a microphonics noise-corrected signal, the black level 1 being at the same, correct level in both the line blanking period THB and the preceding line scan period (and the subsequent line scan period, not shown).

To perform the microphonics correction the first connecting point 8 is connected to an input of a signal sample-and-hold circuit 12, to a switching input of which a switching signal SH1 is applied via an input terminal 13. The switching signal SH1 is a signal having a pulse occurring at the line frequency in approximately the center of the line blanking period THB. The signal SH1 may, for example, be a customary line clamping signal, as shown in detail at the circuit 4 in FIG. 2. The output of the circuit 12 is connected to the connecting point 11 in the signal channel 1 via a series arrangement of a microphonics correction circuit 14, an on-off switch 15 and a resistor 16. The circuit 14 operates as a low-pass filter which further causes the phase of the signal applied to it to be shifted through 180°. At the occurrence of microphonics, the circuit 14 supplies a sinusoidally varying signal in anti-phase, when a staircase varying signal, having steps of a duration equal to a line period, is applied to it. The on-off switch 15 must only pass the correction signal in the presence of microphonics, a switching input thereof being connected for this purpose to a first output 18 of a microphonics detection circuit 17, which comprises three further outputs 19, 20 and 21.

The switching signal SH1 is applied to a signal input of the circuit 17 via an input terminal 22, in response to which switch 15 is switched in the line blanking periods THB, so that no switching noise occurs in the line scanning period, that is to say, on display, in the displayed picture. A further signal input of the circuit 17 is connected to a contact of a selection switch $23_1$, whereas a further input is connected to a contact of a selection switch $23_2$. Together with switches $23_3$ and $23_4$, still to be described, the switches $23_1$ and $23_2$ provide a multiple selection switch 23. The switch $23_2$ has three positions, a first, second and third position being denoted by p, q and r, respectively. The switches $23_1$, $23_3$ and $23_4$ have two positions, denoted by q and p,r. With respect to the switch $23_1$, the selection contact associated with the position p, r is connected to the output of the circuit 12, while the selection contact associated with the position q is unconnected with respect to the switch $23_2$, the selection contacts associated with the position p, q and r are connected to ground and to a terminal carrying a voltage +U1 and unconnected. Depending on the position p, q or r of the selection switch $23_2$, the circuit 17 supplies certain output signals at the four outputs 18, 19, 20 and 21. The first output 18, connected to the switching input of the on-off switch 15, receives, in the position r of the switch $23_2$, a switch-on signal when microphonics are detected or a switch-off signal when no microphonics are detected, and in the position q and p, respectively, the voltage +U1 and ground potential, respectively, always cause the switch 15 to be always in the switch-on and the switch-off state, respectively.

The second output 19 of the circuit 17 is connected to an input of a microphonics test signal circuit 24, the output of which is connected to the third connecting point 9 in the signal channel 1 via the selection switch $23_3$ in the position q and a resistor 25.

Figure 2:
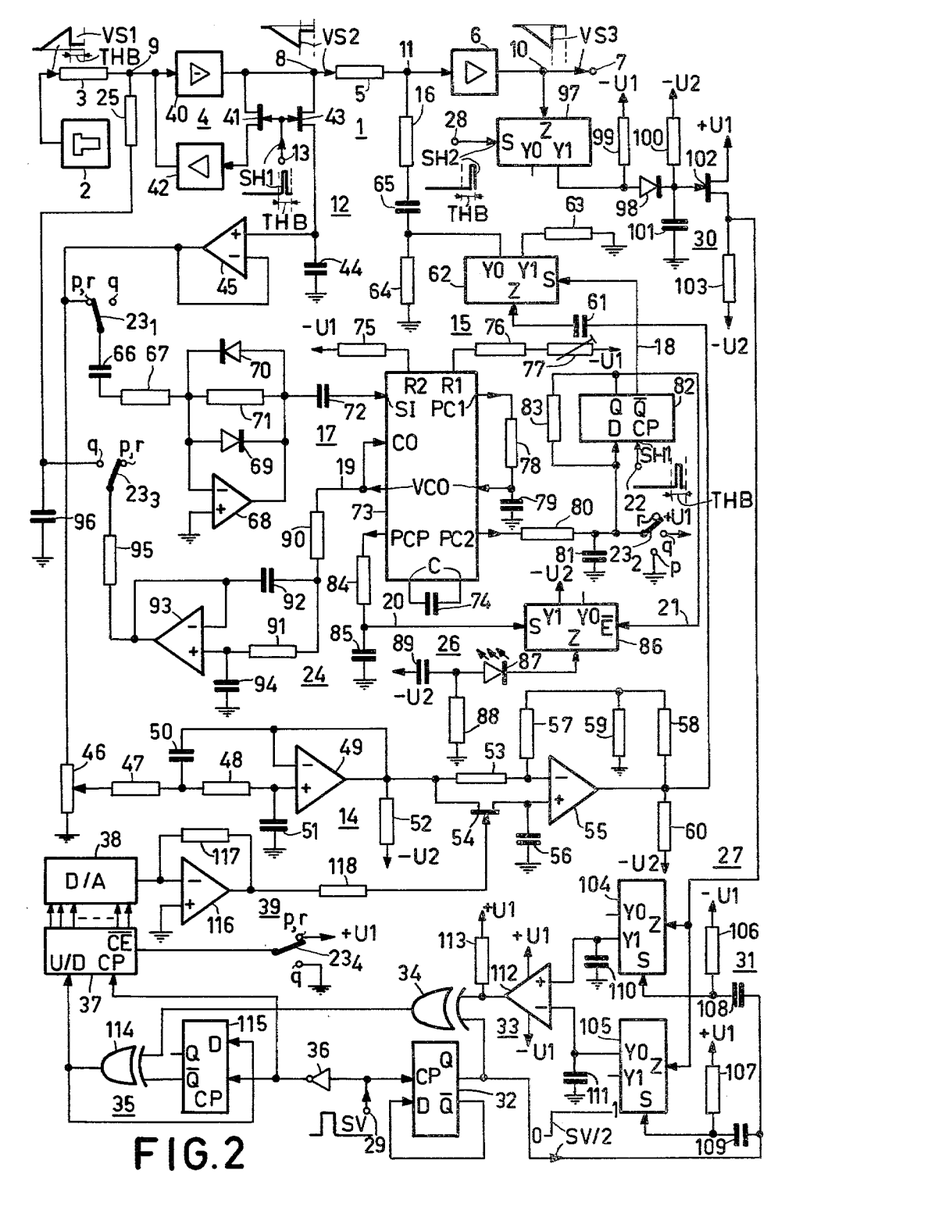
FIG. 2 is a detailed circuit diagram of the embodiment shown by means of the block diagram in FIG. 1.

The third output 20 and the fourth output 21 which, as will become apparent from FIG. 2, carries a signal whose phase is opposite to the phase of the signal at the output 18, are connected to inputs of a pull-in indication circuit 26.

To generate the different signals at the outputs 18, 19, 20 and 21 of the detection circuit 17, this circuit comprises, in accordance with one feature of the invention, a phase-locked loop (PLL) comprising a voltage-controlled oscillator (VCO), to be described in detail for FIG. 2. In accordance with a further feature of the invention the correction circuit 14 comprises a phase adjusting input for a phase shifting network (180°) contained therein, which input is connected to the output of an automatic phase adjusting circuit 27. An input of the circuit 27 is connected to the fourth connecting point 10 in the signal channel 4, while a switching signal SH2 of line frequency, shown next to it, is applied to the circuit 27 via an input terminal 28 and a signal SV of field frequency, shown next to it, via an input terminal 29. A further input of the circuit 27 is connected to the selection switch $23_4$, whose selection contact associated with the positions q and p,r are connected to ground and to a terminal carrying voltage +U1, respectively.

The construction of the automatic phase adjusting circuit 27 is shown in FIG. 1 by means of a block diagram, which is shown in greater detail in FIG. 2. The fourth connecting point 10 in the signal channel 1 is connected to the signal input of a signal sample-andhold circuit 30, the switching input of which is connected to the input terminal 28. The signal SH2 shown has a pulse, occurring at the line frequency, at the end of the line blanking period THB, the pulses not being present in the field blanking period. Of additional importance is that the pulses in the signals SH1 and SH2 do not coincide and have no overlap.

The output of the circuit 30 is connected to the signal input of a field change-over switch 31, a switching input of which is connected to the output of a frequency divider 32, the input of which is connected to the input terminal 29.

The divider 32 divides the pulse-shaped signal SV of field frequency applied to it by a factor of two and produces a square-wave signal SV/2 of half the field frequency or the picture frequency in the case of singular television interlacing. As a result thereof the change-over switch 31, which comprises two outputs, passes information in each alternate field to a signal comparison circuit 33. The output of the circuit 33 is connected to an input of an exclusive-OR gate 34, another input of which is connected to the output of the divider 32. The output of the gate 34 is connected to an input of a storage circuit 35, still further to be described, for retaining a counting direction of a counter, a further input being connected to the input terminal 29 via an inverter 36. The output of the storage circuit 35 is connected to an input of an up-down counter 37, two further inputs of which are connected to the inverter 36 and the selection switch $23_4$, respectively. In the position p, r the selection switch $23_4$ causes the counter 37 to retain its counting position, whereas in the position q the counter 37 is enabled, the inverter 36 producing a clock signal and the storage circuit 35 a signal which determines the counting direction. The outputs of the counter 37, which are represented in the drawing by one sole output, are connected to inputs of a digital-to-analog converter (D/A) 38. The output of the converter 38 is connected to the phase adjusting input of the circuit 14 via an amplifier circuit 39.

The following survey serves to explain the difference in operation of the anti-microphonics circuit shown in FIGS. 1 and 2 in the positions p, q and r of the multiple switch 23.

First position: position p of the switch 23.

In this first position the signal sample-and-hold circuit 12, the microphonics detection circuit 17 and the pull-in indication circuit 26 are in operation during signal processing.

The pick-up tube 2 is subjected in a mechanical or acoustical manner to shock to produce a microphonics noise signal. A center oscillator frequency of the oscillator included in the phase-locked loop circuit in the circuit 17 is set so that the pull-in indication circuit 26 gives an optimum indication. The microphonics detection is then adjusted in an optimum manner.

Second position: position q of the switch 23.

In this next, second position, the circuit 17 does not operate as a detection circuit but as an oscillator circuit, the oscillator which oscillates freely on the adjusted center frequency, producing the oscillator signal on the output 19. The microphonics test signal circuit 24 is in operation and, via the signal sample-and-hold circuit 12, the microphonics correction circuit 14 and the switch 15, which is invariably in the on-position, a microphonics correction signal is applied to the signal channel 1 via the resistor 16. From the signal VS3, from which microphonics has been substantially removed, the phase adjusting circuit 27 takes signal samples at the line frequency, in field blanking periods, (circuit 30), the signal samples of each field being added together. Thereafter signal comparison is effected between the information stored of each field (circuits 31 and 33). If the difference in information between two consecutive fields exceeds a threshold value (circuit 33), the position of the enabled counter 37 is changed in such a direction that the difference in information is reduced by means of the circuit 14. The counting direction is fixed in the circuit 35. When therafter a difference in information is received which is below the threshold value, the counter 37 continues counting until a threshold value is exceeded again, whereafter the counting direction is reversed. Ultimately, the count will slightly fluctuate around an optimum counting position. Then, the circuit 14 produces an optimum microphonics correction.

Third position: position r of the switch 23.

In this third, next position, the anti-microphonics circuit is in operation, which has been adjusted in an optimum manner for microphonics detection and for the phase of the correction signal. The sample-and-hold circuit 12, the microphonics detection circuit 17, the microphonics correction circuit 14 and the on-off switch 15 for the microphonics correction are then in operation, the counter 37 in a certain counting position, the converter 38 and the amplifier circuit 39 effecting the optimum phase shift in the circuit 14.

The use of the oscillator included in the phase-locked loop circuit in the circuit 17 offers the possibility described for the three positions p, q and r of the selection switch 23. Then, the adjusted center oscillator frequency, this frequency being matched to the pick-up tube 2, has an optimum detection capability, whereas the automatic phase adjustment, which, if so desired, can be repeated, effects an in-phase optimum microphonics correction at the center frequency. The correct amplitude of the correction signal can be obtained by means of a predetermined dimensioning of the low-pass filter in the circuit 14, or by the use of a variable resistor in the circuit 14, which is a potentiometer in FIG. 2. In practice, no difficulties are met when the amplitude setting of the correction signal is done by means of dimensioning or by means of adjustment. The optimum phase setting of the correction signal is an essential feature. This optimum phase can be obtained in a simple manner by the automatic phase adjustment at the center frequency.

The detailed embodiment of FIG. 2 shows the same reference numerals and signals as used in FIG. 1. The pre-amplifier circuit 4 comprises an inverting amplifier circuit 40 having a feedback circuit including a field effect transistor 41 and an amplifier 42. The gate electrode of the transistor 41 is connected to, for example, the input terminal 13. The amplifier circuit (40, 41, 42) then operates in known manner as a feedback black level clamping circuit.

The connecting point 8 of the signal channel 1 is connected to ground via a field effect transistor 43 arranged in series with a capacitor 44. The gate electrode of the transistor 43 is connected to the input terminal 13. The junction point of the transistor 43 and the capacitor 44 is connected to a (+) input of a differential amplifier 45 whose (−) input is connected to the amplifier output. During the pulse in the signal SH1, a signal sample is taken in the signal sample-and-hold circuit 12 from the signal VS2 which is stored in the capacitor 44. In the presence of a microphonics noise signal having a frequency between 1 and 3 kHz this signal is sampled at the line frequency, for example with 15625 Hz or 15750 Hz, which results in a staircase signal having steps of a duration equal to the line period.

The output of the amplifier 45 is connected to the switch 23₁, signal application to the microphonics detection, circuit 17 being effected via this switch, and to a potentiometer 46 being part of the microphonics correction circuit 14. The other terminal of the potentiometer 46 is connected to ground and its tap is connected to the (+) input of a differential amplifier 49 via two series-arranged resistors 47 and 48. The junction point of the resistors 47 and 48 is connected to the (−) input and to the output of the amplifier 49 via a capacitor 50. The (+) input of the amplifier 49 is connected to ground via a capacitor 51. Via a resistor 52, the output of the amplifier 49 is connected to a terminal, carrying a voltage −U2, and to the (−) and (+), respectively, input of a differential amplifier 55 via a resistor 53 and the source-drain path of a field effect transistor 54, respectively. The (+) input of the amplifier 55 is connected to ground via capacitor 56 and the (−) input is connected via resistor 57 to the junction point of two resistors 58 and 59, which are arranged in series between the amplifier output and ground. Via a resistor 60 the output of the amplifier 55 is connected to a terminal, carrying the voltage −U2.

The microphonics correction circuit 14 thus comprises an active low-pass filter (47–52) and an adjustable phase shifting network (53–60), the transistor 54 operating as a variable resistor. A desired amplitude of the correction signal present at the output of the amplifier 55 can be adjusted by means of the potentiometer 46. The amplitude can, for example, be adjusted when the multiple switch 23 is in the test signal position q. The transistor 54, which operates as variable resistor, is connected to the output of the amplifier circuit 39 and, in dependence on the output voltage of this amplifier circuit, the transistor 54 has a predetermined value and the sinusoidally varying microphonics correction signal present at the output of the amplifier 55 has a predetermined phase.

The combination of the low-pass filter (47–52) and the phase shifting network (53–60) in the correction circuit 14 offers advantageously a separated amplitude and phase setting, it being possible to obtain the proper amplitude by means of adjustment or by a predetermined dimensioning.

The output of the amplifier 55 is connected to a terminal, denoted by Z, of an electronic switch 62 via a capacitor 61. The switch 62 has a switching input S which is connected to the output 18 of the microphonics detection circuit 17, and two terminals Y0 and Y1. The terminal Y1 is connected to ground via a resistor 63.

The terminal Y0 is connected to ground via a resistor 64 and to the connecting point 11 in the signal channel 1 via the series arrangement of a capacitor 65 and the resistor 16. Thus, the on-off switch 15 of FIG. 1 comprises the capacitors 61 and 65, the resistors 63 and 64 and the switch 62. The electronic switch 62 is, for example, part of a triple 2-channel analog multiplexer/demultiplexer marketed by "Philips", type HEF 4053B. Herein, the terminal Z is through-connected to the terminal Y0 when a low voltage (which corresponds with a logic 0) is present at the switching input S, whereas the terminal Z is through-connected to the terminal Y1 when a high voltage (corresponding with a logic 1) is present. Thus, at S(62)=1, the connection Z-Y1(62) is present, the on-off switch 15 being in the switched-off position. At S(62)=0, the connection Z-Y0(62) is present and the on-off switch 15 is in the switched-on position to pass the microphonics correction signal received from the circuit 14 on. The described construction of the on-off switch 15 ensures that no annoying transition signals occur during switch-on or switch-off.

For the microphonics detection circuit 17 of FIG. 2 it holds that the switch 23₁ is connected to a series arrangement of a capacitor 66 and a resistor 67. The other terminal of the resistor 67 is connected to the (−) input of a differential amplifier 68, the anode and cathode, respectively, of a pair of diodes 69 and 70, respectively, and to a resistor 71. The (+) input of the amplifier 68 is connected to ground and the output to the cathode and anode, respectively, of the diodes 69 and 70 to the other terminal of the resistor 71 and to an input, denoted by SI, of a phase-locked loop circuit 73, via a capacitor 72. The amplifier 68 provides, in combination with the diodes 69 and 70 and the resistor 71 an amplifier-limiter circuit (68–71).

The phase-locked loop circuit 73 is, for example, of the "Philips" type HEF 4046 B and comprises inter alia two phase comparators and a voltage-controlled oscillator VCO. SI and CO denote common inputs of the phase comparators. PC1 denotes the output of one of the phase comparators, this output carrying a digital error signal. Digital error signal-carrying outputs of the second phase comparator are denoted by PC2 and PCP. Still further connecting points which are of importance are denoted by a C and R1 and R2. The linear oscillator VCO applies its output signal to the output, the frequency being determined by the input voltage of the oscillator VCO and the values of a capacitor 74, connected to the C-terminals, a resistor 75, connected to the R2-terminal, and a resistor 76, connected to the R1-terminal, in series with a variable resistor 77. The resistors 75 and 77 are connected to terminals carrying the voltage −U1. The input voltage for the oscillator VCO is received, via a smoothing filter (78, 79), from the output PC1, this filter comprising a resistor 78, connected to the output PC1 and a capacitor 79, connected to ground.

Via a resistor 80, the output PC2 of the circuit 73 is connected to the selection switches 23₂, the junction being connected to ground via a capacitor 81. The output PC2 is connected to a D-preparatory input of a flip-flop 82 via a smoothing filter (80, 81) formed thus. Two outputs of the flip-flop 82, which carry inverse signals, are denoted by Q and $\bar{Q}$, while CP denotes a clock pulse input which is connected to the input 22 to which the signal SH1 is applied. The Q-output of the flip-flop 82 is connected to the D-input via a resistor 83. The $\bar{Q}$- and Q-output, respectively, of the flip-flop 82 are the first output 18 and the fourth output 21, respectively, of the circuit 17, which are connected to the on/off switch 15 and the pull-in indication circuit 26, respectively.

The output PCP of the circuit 73 is connected to ground via a series arrangement of a resistor 84 and a capacitor 85. The junction point in a smoothing filter (84, 85) formed thus provides the third output 20 of the circuit 17. In the pull-in indication circuit 26, the output 20 is connected to the switching input S of an electronic switch 86. The switch 86 is identical to the switch 62 but is provided with a further input $\bar{E}$, being an inverse enable input and connected to the fourth output 21 of the circuit 17. A logic 0 on the E̅-input releases the switch 86 so that a logic 1 or 0 at the S-input results in a connection Z-Y1 and Z-Y0, respectively, whereas a logic 1 on the E̅-input puts the switch 86 out of operation in a dominating manner, without a through-connection.

The Y0-terminal of the switch 86 is unconnected and the Y1-terminal is connected to a terminal carrying the voltage $-U_2$. The Z-terminal is connected to the cathode of a light-emitting diode 87, which is connected at its anode to ground and to the terminal carrying the voltage $-U_2$, respectively, via a resistor 88 and a capacitor 89, respectively.

The output of the oscillator VCO in the circuit 73 is connected to the CO-input thereof and further provides the second output 19 of the circuit 17, which is connected to the test signal circuit 24. In the circuit 24 the output 19 is connected to a terminal of a resistor 90, whose other terminal is connected to the (+)−input and to the (−)−input and the output of a differential amplifier 93, respectively, via a resistor 91 and a capacitor 92. The (+)−input of the amplifier 93 is connected to ground via a capacitor 94 and the output to the selection switch $23_3$ via a resistor 95. The selection contact, associated with the q-position, of the switch $23_3$, is connected to the connecting point 9 in the signal channel 1 via the resistor 25 and to ground via a capacitor 96. Thus, the test signal circuit 24 comprises the components 90 to 96; it should be noted that in the circuit 24, shown in FIG. 1, the capacitor 96 is assumed to be connected to the switch-on contact of the switch $23_3$. When operating as a filter, the microphonics test signal circuit 24 as shown in FIGS. 1 and 2 produces a substantially sinusoidally varying test signal from the oscillator signal at the output 19 of the circuit 17.

Before describing the automatic phase adjusting circuit 27 of FIG. 2, which is operative in the q-position of the multiple selection switch 23, we shall first describe the operation of the circuit of FIG. 2 in the p- and r-positions of the switch 23.

In the p-position of the switch 23, the switch $23_2$ applies the ground potential, corresponding with the logic 0, to the D-input of the flip-flop 82. As it holds for the D-type flip-flop 82 that the Q-output must start carrying, at the occurrence of an ascending pulse edge in the signal at the clock pulse input CP, the logic 0 or 1 present at the D-input, when not present already, it follows that in the p-position the Q-output of the flip-flop 82 carries the logic 0 in the stable state. In response thereto the logic 0 is present at the E̅-input of the switch 86, which is consequently enabled.

When the pick-up tube 2 is intentionally subjected to shock to produce a microphonics signal, the variable resistor 77 is changed so that the oscillator VCO in the phase-locked loop circuit 73 pulls in. A signal is then present at the PCP-output of the circuit 73 with an average, positive value. After having been smoothed in the smoothing filter (84, 85), the positive voltage acts as a logic 1 at the switching input S of the switch 86. Before the logic 1 occurs at the S-input, it holds that S(86)=0 for the through-connection Z-Y0(86). Then there is no voltage across the diode 87 and the ground potential is present at the junction of the capacitor 89, the resistor 88 and the diode 87. The logic 1 at the S-input when S(87)=1 causes the through-connection Z-Y1 to be produced, the voltage U2 being instantaneously impressed on the diode 87, which consequently emits light. It appears that lighting-up of the diode 87 is the indication at the circuit 26 about the pulling in, and the resistor 77 is then adjusted so that the center oscillator frequency of the oscillator VCO of the circuit 73 is approximately in the center of the pull-in range. This may be a center oscillator frequency of, for example, approximately 2 kHz.

In the r-position of the selection switch $23_2$, the D-input of the flip-flop 82 is connected to the PC2-output of the circuit 73 via the smoothing filter (80, 81). In the absence of microphonic there is no signal to be pulled-in at the input SI of the circuit 73 and the outputs PC2 and PCP no longer produce a signal having a positive, average value. The logic 0 on the S-input of the switch 86 results in the through-connection Z-Y0, while the logic 1 on the Q-output of the flip-flop 82 at the switch 62 results in the through-connection Z-Y1. If thereafter microphonics occurs, it produces a signal having a positive, average voltage at the outputs PC2 and PCP. The resultant logic 1 at the D-input of the flip-flop 82 produces, in response to the next positive pulse edge in the signal SH1 at the clock pulse input CP, a logic 0 at the Q̅-output, causing the switch 62 to obtain the through-connection Z-Y0, and a logic 1 at the Q-output, causing the switch 86 to be blocked. It appears that when microphonics is detected, the switch 62 changes over in the next line blanking period THB and passes the correction signal coming from the circuit 14. It should be noted that when microphonics is detected, information is obtained earlier at the output PC2 than at the output PCP (for the described type of the circuit 73) and further that when the diode 87 lights up, a delay occurs which is longer than one line period so that there is absolute certainty that the switch 86 is blocked before the logic 1 occurs at the S-input. Consequently, the circuit 26 is put out of operation in the r-position of the switch $23_2$.

When the automatic phase adjustment by means of the test signal is refrained from, the transistor 54 in the circuit 14 may be replaced by an adjustable resistor 54', not shown. Empirically, when viewing a displayed picture, the potentiometer 46 can first be adjusted to obtain the optimum amplitude of the correction signal at a (microphonics) frequency of 2 kHz, whereafter the adjustable resistor 54' can be adjusted to obtain the optimum phase of the correction signal at which, for example, a proper microphonics correction occurs at frequencies between 1.4 and 3.2 kHz.

The circuit 17 may be used instead of empirically adjusting the phase of the microphonics correction signal. The connecting point 10 in the signal channel 1 is connected to a terminal Z of an electronic switch 97. The switching input S of the switch 97 is connected to the input terminal 28, to which the signal SH2 is applied, the terminal Y0 being unconnected and the terminal Y1 being connected to the anode of a diode 98 and, via a resistor 99, to a terminal having the voltage $-U_1$. The cathode of the diode 98 is connected to a terminal having the voltage $-U_2$ via a resistor 100 and to ground via a capacitor 101, and is also connected to the gate electrode of a field effect transistor 102. The drain of the transistor 102 is connected to a terminal having a voltage $+U_1$ and via a resistor 103 the source is connected to a terminal having the voltage $-U_2$.

Thus, the signal sample-and-hold circuit 30 is comprised of the components 97 to 103, inclusive. The diode 98, the capacitor 101 and the resistor 100 operate as a peak rectifier, the transistor 102 functioning as a buffer. The signal samples are taken from the signal VS3 under the control of the signal SH2 which has a pulse of the line frequency at the end of the line blanking periods THB, in the field scanning periods.

The source of the transistor 102 is the output of the circuit 30, which is connected to the field change-over switch 31 and is connected therein to the terminal Z of two electronic switches 104 and 105. The switching inputs S of the switches 104 and 105, respectively, are connected to a terminal having a voltage −U1 via a resistor 106, and to a terminal having a voltage +U1 via a resistor 107, and, via capacitors 108 and 109, respectively, to the Q-output of a D-type flip-flop, which constitutes the frequency divider 32. The clock pulse input CP of the flip-flop frequency divider 32 is connected to the input terminal 29, to which the signal SV of the field frequency is applied, while the D-input is connected to the $\overline{Q}$-output. The flip-flop frequency divider 32 has a division factor equal to 2, each ascending pulse edge in the signal SV causing the flip-flop to change state, since the inverse $\overline{Q}$-output is connected to the preparatory input D.

The square-wave signal SV/2 at the Q-output of the flip-flop frequency divider 32 is applied to the S-inputs of the switches 104 and 105, respectively, via differentiating circuits (106, 108) and (107, 109). Before an ascending pulse edge occurs in the signal SV/2, it holds for the switch 104 that S (104)=0 with the through-connection Z-Y0, while for the switch 105 it holds that S(105)=1 with the through-connection Z-Y1. The connecting points Y0 of the switch 104 and Y1 of the switch 105 are free. An ascending pulse edge in the signal SV/2 has no consequences for the switch 105, but a positively going, differentiated pulse does have consequences for the switch 104 for which it holds that S(104)=1 with the through-connection Z-Y1, occurs at the input S of the switch 104. The result is that at the beginning of a field the information of the preceding field, stored in the capacitor 101, is passed on to the connecting point Y1 and, consequently, to a capacitor 110 connected thereto. Likewise, a descending pulse edge in the signal SV/2 has no consequences for the switch 104 but does have consequences for the switch 105, as it then holds for the latter that S(105)=0 with the through-connection Z-Y0, so that at the beginning of the next field the information coming from the capacitor 101 is passed on to a capacitor 111 connected to the connecting point Y0. It appears that the field change-over switch 31 is comprised of the components 104 to 109, inclusive.

The capacitors 110 and 111 have one terminal connected to ground and the terminals which are connected to the switches 104 and 105, respectively, are connected to the (+) and the (−) input, respectively, of a differential amplifier 112. Two power supply terminals of the differential amplifier 112 are connected to two terminals carrying the voltage +U1 and −U1, respectively. Via a resistor 113, the output of the amplifier 112 is connected to a terminal having the voltage +U1 and is also connected to an input of the exclusive-OR gate 34, another input of which is connected to the Q-output of the flip-flop frequency divider 32. Thus, the signal comparator circuit 33 comprises the components 110 to 113, inclusive.

In the signal processing circuit 33, signal comparison is effected between the signal samples applied alternately to the capacitors 110 and 111 at the beginning of each field and corresponding to the positive peak value in the signal VS3 present during the pulse in the signal SH2 at the end of the line blanking period THB. Let it be assumed that the signal samples applied to the capacitors 110 and 111 are equal during a number of field periods. At the amplifier 112 a leakage current flows to the capacitors 110 and 11, causing the capacitor, which does not receive a signal sample at the beginning of the field, to be subjected to a small positive voltage increase. In response thereto the amplifier 112 produces alternately in each field, negative and positive voltages corresponding to the logic 0 and 1, these logic values being combined with those in the signal SV/2 via the gate 34. Starting from an equal signal sample having the value a volts and a voltage increase of b volts caused by the leakage current for the capacitors 110 and 111, the following Table 1 is obtained.

TABLE 1

| logic values in signal SV2: | 1, | 0, | 1, | 0 |
|---|---|---|---|---|
| voltage across capacitor 110, at the (+) amplifier input | a, | a + b, | a, | a + b |
| voltage across capacitor 111, at the (−) amplifier input | a + b, | a, | a + b, | a |
| logic values at the output of the amplifier 112 | 0, | 1, | 0, | 1 |
| logic values at the output of the gate 34 | 1, | 1, | 1, | 1 |

It appears that for equal signal samples a for the capacitors 110 and 111, the gate 34 carries a logic 1. This also holds for a decreasing signal sample a−a1.

With an increasing signal sample a+a1, for which it holds that a1 is greater than b, the situation changes and the Table 2 applies.

TABLE 2

| logic values in signal SV2: | 1, | 0, | 1, | 0 |
|---|---|---|---|---|
| voltage across capacitor 110, at the (+) amplifier input | a, | a + b, | a + a1, | a + a1 + b |
| voltage across capacitor 111, at the (−) amplifier input | a + b, | a + a1, | a + a1 + b, | a + a1 |
| logic values at the output of the amplifier 112 | 0, | 0, | 0, | 1 |
| logic values at the output of the gate 34 | 1, | 0, | 1, | 1 |

It appears that for a signal sample increase (a1) which exceeds the voltage increase (b) produced by the leakage current and used as threshold value, the gate 34 supplies a logic 0.

The output of the gate 34 is connected to the storage circuit 35 for retaining a counting direction and is connected therein to an input of an exclusive-OR gate 114, another input of which is connected to the $\overline{Q}$-output of a D-type flip-flop 115. The flip-flop 115 and the gate 114 provide the storage circuit 35. The clock pulse input CP of the flip-flop 115 is connected to the output of the inverter 36, the input of which is connected to the input terminal 29 to which the signal SV of field frequency is applied. Owing to the fact that the signal is inverted by means of the inverter 36, the trailing edge of the pulse shown in the signal SV is applied as trigger pulse edge to the flip-flop 115. The output of the gate 114 is connected to the preparatory input D of the flip-flop 115.

The operation of the storage circuit 35 will now be described with reference to Table 2.

When the gate 34 supplies the logic 1, it holds that if a logic 0 or 1 occurs at the $\overline{Q}$-output of the flip-flop 115, the gate 114 supplies a logic 1 or 0 which occurs at the D-input and is associated with the assumed logic 0 or 1 at the $\overline{Q}$-output. It appears that when the gate 34 supplies the logic 1, the circuit 35 is not affected. When, in the manner derived from Table 2, the logic 0 occurs, at the pulse leading edge in the signal SV, at the output of the gate 34, then the logic 0, which is, for example, present at the $\overline{Q}$-output, will cause the gate 114 to start carrying the logic 0, which is thereafter present at the D-input when the pulse trailing edge in the signal SV occurs. This causes the flip-flop 115 to change state and the $\overline{Q}$-output will carry the logic 1, as a result of which the logic 1 occurs again at the output 114. The logic 1 remains there until at the next pulse leading edge in the signal SV, the logic 1 occurs again at the output of the gate 34 (Table 2). The gate 114 then supplies the logic 0, which is present at the D-input of the flip-flop 115 when the trailing edge of the signal SV occurs as the trigger pulse edge at the CP-input. The logic 1 at the $\overline{Q}$-output is associated herewith so that the flip-flop 115, which has changed state, is in the stable state. A similar derivation holds when the logic 0 is taken as the starting point instead of the logic 1.

It appears that an increased signal sample at the capacitors 110 and 111 causes the flip-flop 115 to change state, so that the circuit 35 supplies the other logic value, namely to an up-down counting input U/D of the up-down counter 37. The clock pulse input CP of the counter 37 is connected to the output of the inverter 36, while an inverse enable input $\overline{CE}$ is connected to the switch 23₄. The counter 37 is enabled in the q-position of the switch 23₄ and, depending on whether a logic 0 or 1 is applied, the counting position is decreased or increased by one unit at the occurrence of the trailing edge of the pulse in the signal SV. The counter 37 is, for example, an 8-bit counter, eight outputs being connected to the digital-to-analog converter 38.

The converter 38 is followed by the amplifier circuit 39 and the output of the converter 38 is connected therein to the (−) input of a differential amplifier 116, the (+) input of which being connected to ground. The output of the amplifier 116 is connected to the (−) input thereof via a resistor 117 and to the gate electrode of the transistor 54, which functions as a variable resistor, via a resistor 118.

It appears that the phase adjustment is effected by comparing the signal samples obtained in consecutive fields during the generation of the test signal with one another, a difference value obtained from an incomplete correction and being higher than a threshold value resulting in a change in the counting position, resulting in a lower difference value which corresponds with an improved correction. When an optimum correction with a lowest possible difference value which is within the threshold value is obtained, the difference value increases again when counting is continued, the counting direction reversing when the threshold value is passed, which results in counting-up and counting-down around the optimum counting position.

The circuit shown in FIG. 2 does not comprise an indication circuit indicating that the optimum phase adjustment has been achieved, which is apparent from the alternate up and down-counting by the counter 37 round the optimum counting position. A suitable detection and indication circuit is within the grasp of one skilled in the art, so that a further description thereof is refrained from.

In addition to the components described in the foregoing there now follows, by way of example, the values and types of some of the components in the circuit shown in FIG. 2, which are essential to the invention:

| resistor 46 | 1kΩ | amplifiers 49 | and 55: LM 224 |
|---|---|---|---|
| 47 | 9760Ω | capacitor 50 | 5,6 nF |
| 48 | 10kΩ | 51 | 2,7 nF |
| resistor 52 | 12kΩ | resistor 60 | 12kΩ |
| 53 | 4990Ω | capacitor 74 | 100 nF |
| transitor 54 | BF 246 | resistor 75 | 27kΩ |
| resistor 54' | 2500Ω | 76 | 4700Ω |
| capacitor 56 | 100 nF | 77 | 10kΩ |
| resistor 57 | 4530Ω | voltage U1: | 5 V |
| 58 | 1kΩ | U2: | 12 V |
| 59 | 1kΩ | | |

For the specific construction of the microphonics correction circuit 14 it holds that the resistors 52 and 60 are provided to lend the outputs of the amplifiers 49 and 55, which are provided with a class-B output stage, a class-A output character. The resistors 58 and 59 provide a feedback of such a shape that the phase adjustment does not affect the amplitude of the output signal.

What is claimed is:

1. A television camera having a camera signal channel including a television pick-up tube and an output terminal, and having an anti-microphonics circuit which includes a microphonics detection circuit, a microphonics correction circuit and an on-off switch for microphonics correction depending on whether or not microphonics noise is detected, characterized in that said microphonics detection circuit comprising a signal sample-and-hold circuit, coupled to said camera signal channel at a first connecting point, for processing a video signal which possibly contains a microphonics noise signal, and a phase-locked loop circuit having a voltage controlled oscillator therein coupled to said sample-and-hold circuit, a first output of said phase-locked loop circuit being connected to a switching signal input of said on-off switch, whereby, on the occurrence of a microphonics noise signal, said microphonics detection circuit produces a switching signal on the first output of said phase-locked loop circuit causing said on-off switch to close.

2. A television camera as claimed in claim 1, characterized in that said microphonics correction circuit is coupled to said first connecting point for generating a correction signal in anti-phase relation to said microphonics noise signal and includes an input for receiving a signal adjusting the phase thereof, said on-off switch coupling the output from said microphonics correction circuit to said camera signal channel at a second connecting point following after said first connecting point, and said anti-microphonics circuit further comprises a microphonics test signal circuit coupled to a second output of said phase-locked loop circuit, said second output carrying an oscillator signal from the voltage controlled oscillator, and a test signal on-off selection switch for selectively coupling the microphonic test signal circuit to said camera signal channel at a third connecting point which precedes said first connecting point, and an automatic phase adjusting circuit coupled to said camera signal channel at a fourth connecting point which follows after said second connecting point, which circuit provides a phase adjusting signal for said input of said microphonics correction circuit.

3. A television camera as claimed in claim 2, characterized in that the anti-microphonics circuit comprises a multiple selection switch having three positions, in a first position of the switch the signal sample-and-hold circuit, the microphonics detection circuit and the pull-in indication circuit are in operation, whereby, in the presence of a microphonics noise signal coming from the pick-up tube the center oscillator frequency of the oscillator may be adjusted, in a second position of the switch the oscillator in the phase-locked loop circuit of the detection circuit oscillates freely at the adjusted center frequency and produces the oscillator signal at the second output of the phase-locked loop circuit, the microphonics test signal circuit, the signal sample-and-hold circuit, the microphonics correction circuit, and the phase adjusting circuit are in operation, the on-off switch for the microphonics correction being in the on-position, and in a third position of the switch which corresponds with the anti-microphonics circuit being in the adjusted state, the signal sample-and-hold circuit, the microphonics detection circuit and the microphonics correction circuit are in operation, the on-off switch being on.

4. A television cameras as claimed in claim 2, characterized in that the phase adjusting circuit comprises a series arrangement including a signal sample-and-hold circuit, which is in operation in line blanking periods during field scanning periods, a field change-over switch coupled to said signal sample-and-hold circuit for alternately, in each field, applying the signal samples to a signal comparison circuit, a storage circuit coupled to said signal comparison circuit for retaining a counting direction of a counter coupled thereto, the counting direction being reversed when an increase of the signal samples occurs, a digital-to-analog converter following after the counter, and an amplifier circuit coupled to said converter, the output of said amplifier circuit being connected to the phase adjusting input of the microphonics correction circuit.

5. A televsion camera as claimed in claim 1 or 2, characterized in that the microphonics correction circuit comprises a low-pass filter connected to an input of the circuit, and an adjustable phase shifting network, the input being coupled to the first connecting point in the camera signal channel, and the low-pass filter being connected to an output of the microphonics correction circuit via the adjustable phase shifting network.

6. A television camera as claimed in claim 1 or 2, characterized in that said anti-microphonics circuit further comprising a switchable pull-in indication circuit coupled to a third output of said phase-locked loop circuit, which third output carries an in-phase signal for a microphonics noise signal and the oscillator signal.

* * * * *